Oct. 20, 1942.    H. TORMYN    2,299,192
METHOD OF MAKING SINTERED ARTICLES
Filed Sept. 7, 1939
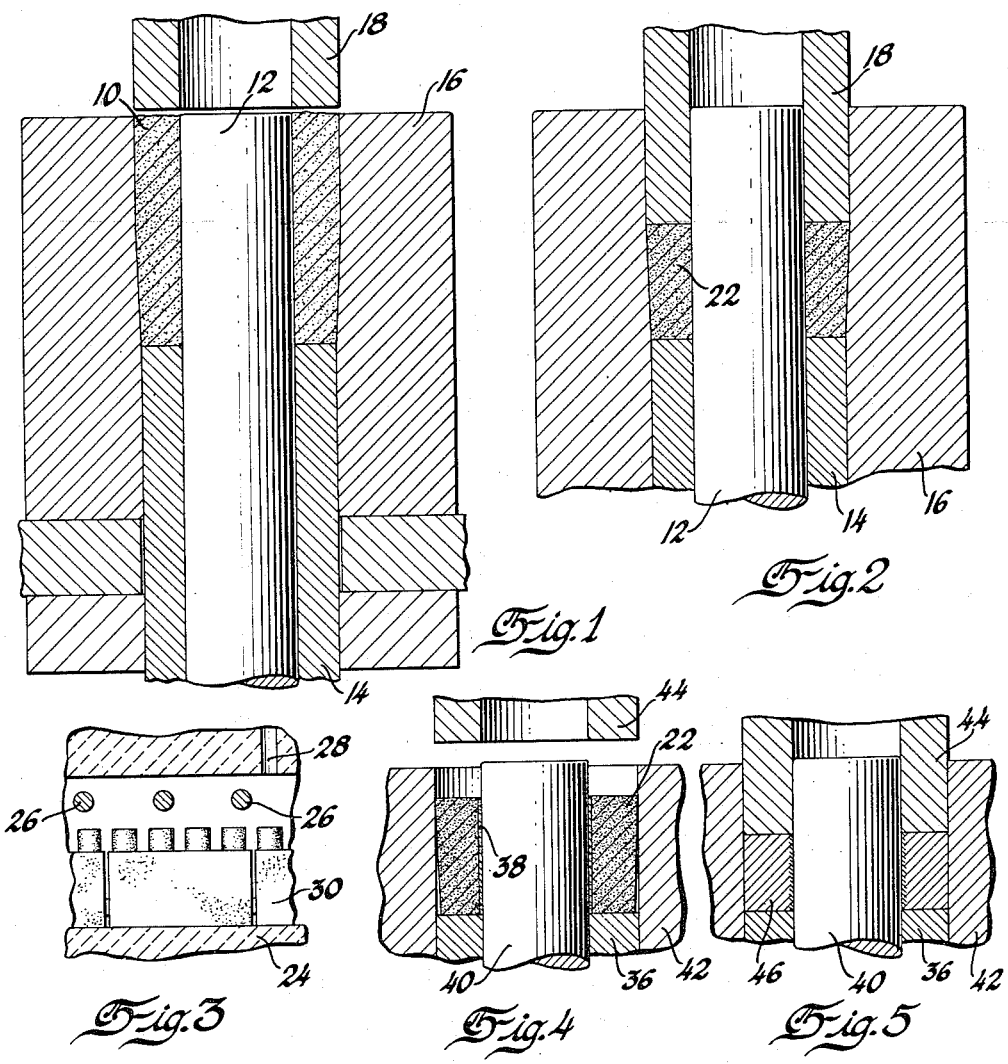

Patented Oct. 20, 1942

2,299,192

UNITED STATES PATENT OFFICE 2,299,192

METHOD OF MAKING SINTERED ARTICLES

Herman Tormyn, Detroit, Mich., assignor to General Motors Corporation, Detroit, Mich., a corporation of Delaware Application September 7, 1939, Serial No. 293,664

5 Claims. (Cl. 75—22)

This invention relates broadly to the formation of an article of compressed and sintered powdered metal and more specifically to the formation of a bearing of compressed and sintered powdered ferrous metal having a bearing surface containing a softer metal such as copper.

One object of my invention is an improved method of making an article of powdered metal.

Another object of my invention is an improved method of making a bearing composed largely of compressed and sintered powdered iron and having a facing containing a softer metal.

It is also an object of my invention to provide an improved method of making a ferrous metal bearing having a coating or facing containing a softer metal.

A specific object of my invention is to provide an improved method of making a strong sintered ferrous metal bearing having thereon a facing containing copper.

Still another object of my invention is an improved method of making wear and score resistant iron bushings wherein expensive machining operations are eliminated.

Other objects and advantages of my invention will become more apparent as the description proceeds.

The invention comprises the formation of articles, especially articles such as bearings and bushings, of pressed and sintered powdered ferrous metals which may be used in place of similar articles made in more conventional ways such as casting, machining, etc. The powdered iron can be pressed into the form desired and in this way expensive machining operations are eliminated. Pressed and sintered bearings and bushings of powdered iron in accordance with the invention have the advantage over bearings and bushings of cast iron in that the possibility of seizing or scoring a shaft running therein is greatly lessened.

The pressed and sintered bearing or bushing preferably has a copper or copper containing facing formed thereon. Other metal facings softer than iron may be used in place of copper if desired. The copper or other metal facing softer than iron may be applied in different ways. Preferably the copper is applied to the sintered ferrous metal bearing or bushing in powdered form. The copper powder may be mixed with a suitable liquid and painted on the bearing face of the sintered bearing or bushing, or the copper powder may be mixed with another metallic powder such as iron powder and placed in intimate contact with the surface of the bearing or bushing. In either case the copper powder or copper containing powder is heated or sintered at a temperature less than the melting point of copper to cause the copper to diffuse into, or alloy with, the sintered iron bearing or bushing and form the bearing surface thereof.

It is preferred, also, to subject the sintered metal bearing or bushing formed of the powdered ferrous metal to a second pressing operation to densify the somewhat porous structure resulting from the first pressing and sintering. Where the second pressing operation is to be used, it is of advantage to apply the copper powder, or copper containing powder, to the bearing surface of the bearing or bushing resulting from the first pressing and sintering operation and compress the copper powder or copper containing powder, and the sintered iron bearing or bushing at the same time. Thereafter the compressed copper, or copper containing, facing and compressed sintered bearing or bushing are heated to a sintering temperature less than the melting point of the copper as described.

For a better understanding of the present invention attention is directed to the accompanying drawing and detailed description forming a portion of this specification.

In the drawing:

Figure 1 is a sectional view of one form of apparatus that may be used to press or briquet metal powder into bushing form, the several parts being shown in position prior to pressing the metal powder and the metal powder being shown loaded therein.

Figure 2 is a sectional view of a portion of the apparatus of Figure 1 showing the parts as they appear at the completion of the pressing operation.

Figure 3 is a diagrammatic sectional view of a sintering furnace showing some of the bushings therein.

Figure 4 is a sectional view showing a sintered bushing with a copper containing powder facing in place in an apparatus that may be used for carrying out a second pressing operation, the several parts being in position prior to the start of the second pressing operation.

Figure 5 is a sectional view of the apparatus of Figure 4 with the several parts as they appear at the completion of the second pressing operation.

Figure 6 is a perspective view of one of the bushings.

Referring to Figure 1, 10 indicates a supply of iron powder of suitable fineness within a cavity or pocket formed by an arbor or mandrel 12, a sleeve 14 coaxially arranged with respect to the mandrel, and a die part 16. The iron powder may be of any suitable kind such as powdered sponge iron, powdered electrolytic iron, or powdered iron made in other suitable manner. The iron powder may contain small amounts of alloying constituents such as carbon, silicon, manganese, etc. A suitable binder may be mixed with the iron powder, if desired. An iron powder that will pass through an 80 mesh screen produces satisfactory results, although wide variation from this is permissible.

A hollow plunger 18 is adapted to move with respect to parts 12, 14 and 16 to press the iron powder into the bushing shape indicated at 22 in Figure 2. The pressure used in pressing the ferrous metal powder preferably is of the order of 30 to 50 tons per square inch.

Following the first pressing operation the bushings are heated to a sintering temperature of about 2000° F. to 2050° F. in a suitable furnace atmosphere such as one containing hydrogen. In Figure 3 is shown a sintering furnace 24 having electrical heating elements 26 and an opening 28 through which hydrogen or other protecting medium may enter the furnace. The bushings may be carried through the furnace by means of a conveyor 30.

After the bushings are sintered and have become cooled they have a facing of softer metal such as copper applied thereto. The sintered bushings may be coated on the bearing surface with a copper powder mixed with a suitable liquid such as, for example, a lacquer, varnish or other equivalent liquid. Other methods of coating or painting the sintered bushing may be employed. The copper facing and sintered iron bushing are thereafter sintered at a temperature less than the melting point of copper to cause the copper to diffuse in, or alloy with, the bushing. In place of coating or painting a copper powder onto the bushing as described, a mixture of iron and copper powders may be applied to the bearing surface of the bushing, pressed therewith to compact the mixture of powders and densify the bushing, and thereafter sintered at a temperature less than the melting point of copper. Considerable variation in the composition of the powdered mixture of iron and copper is permissible. A ratio of about 3 parts iron powder to one part copper powder has proven satisfactory.

The sintered iron bushing resulting from the first pressing and sintering operation and having a copper facing may be used as a bearing without further treatment. However, it is greatly preferred to subject the bushing to a second pressing operation in order to densify the somewhat porous ferrous metal bushing resulting from the first pressing and sintering operation.

The apparatus for carrying out the second pressing operation is shown in Figures 4 and 5. In this figure is shown a sintered bushing 22 in position on press member 36, there being shown a layer 38 of a mixture of copper and iron powder between the inner face of the bushing and mandrel or arbor 40. Die member 42 is adapted to contact the outer surface of the bushing and form the outer portion of the bushing in the second pressing operation. An annular plunger 44 is adapted to move with respect to member 36 to press the sintered bushing 22 and mixture of iron and copper powders to form the bushing 46 shown in Figure 5. A pressure of about 60 tons or more per square inch may be used.

The bushing 46 is thereafter heated to a sintering temperature less than the melting point of the copper in a furnace generally similar to that shown in Figure 3. A temperature of approximately 1900° F. has proven satisfactory for this purpose. Figure 6 shows the completed bushing 50. If desired, the product resulting from the second sintering operation may be given a further sizing operation, although for most purposes this is usually not necessary. One of the advantages of a pressed and sintered powdered metal bushing is that no machining is necessary.

If desired, a metal backing member, for example one formed of sheet steel, may be used as a support and the iron powder pressed into intimate contact therewith and the assembly heated to a sintering temperature to form a composite bearing or bushing structure, which can be subjected to a further pressing operation to reduce the porosity of the sintered powdered metal portion, if desired, and which may have a copper facing applied to the sintered powdered iron as hereinbefore described.

Various changes and modifications of the embodiment of my invention herein disclosed may be made without departing from the spirit and principle of my invention and I do not intend to limit the patent granted for my invention except as necessitated by the prior art.

I claim:

1. A method of making a bearing which comprises, pressing ferrous metal powder under high pressure into bushing shape, sintering the bushing in a hydrogen atmosphere furnace at a temperature of about 2000° F. to 2050° F., thereafter applying copper powder to a bearing surface of the sintered iron bushing, pressing the bushing and copper powder to compact the copper powder and densify the sintered iron bushing, and thereafter sintering the bushing and copper facing at a temperature of approximately 1900° F. in a hydrogen atmosphere.

2. A method of making a bearing as in claim 1, in which the copper powder is applied to the bearing surface of the sintered iron bushing by coating the same with a mixture of copper powder and a liquid.

3. A method of making an article which comprises, pressing ferrous metal powder under high pressure to the form desired, sintering said form of pressed ferrous metal powder, forming a facing containing copper on said sintered form by coating the sintered form with a mixture of copper powder and a liquid and thereafter sintering at a temperature less than the melting point of copper.

4. A method of making an article which comprises pressing ferrous metal powder under high pressure into the general shape desired in the finished article, sintering the pressed ferrous metal powder, applying copper powder to a face of the sintered iron article by painting a surface of the sintered iron article with a mixture of copper powder and a liquid, pressing the sintered iron article and copper powder to densify the same, and thereafter sintering at a temperature less than the melting point of copper.

5. A method of making a sintered article which comprises, pressing ferrous metal powder under high pressure into a briquette having the general shape desired in the final article, sintering the briquette in a non-oxidizing atmosphere furnace at a temperature of about 2000° F. to 2050° F., thereafter applying copper powder to a surface of the sintered iron briquette, pressing the sintered iron briquette and copper powder to compact the copper powder and densify the sintered iron briquette, and thereafter sintering the sintered iron briquette, and copper facing at a temperature of approximately 1900° F. in a non-oxidizing atmosphere.

HERMAN TORMYN.